（12）United States Patent
Zhu et al.

(10) Patent No.: US 7,817,575 B2
(45) Date of Patent: Oct. 19, 2010

(54) METHOD FOR ACHIEVING FAIRNESS IN A NETWORK

(75) Inventors: Jing Zhu, Hillsboro, OR (US); Yang Xue, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 11/870,010

(22) Filed: Oct. 10, 2007

(65) Prior Publication Data

US 2009/0097456 A1 Apr. 16, 2009

(51) Int. Cl.
*H04J 1/16* (2006.01)
*H04B 7/212* (2006.01)
*H04L 12/413* (2006.01)
(52) U.S. Cl. .................. 370/252; 370/442; 370/448
(58) Field of Classification Search .................. 370/252, 370/442, 445, 456, 465, 458, 447, 448
See application file for complete search history.

(56) References Cited

U.S. PATENT DOCUMENTS

| | | | |
|---|---|---|---|
| 2002/0163933 A1* | 11/2002 | Benveniste | 370/465 |
| 2003/0103521 A1* | 6/2003 | Raphaeli et al. | 370/445 |
| 2003/0145095 A1* | 7/2003 | Liu et al. | 709/230 |
| 2007/0047570 A1* | 3/2007 | Benveniste | 370/448 |
| 2007/0135162 A1* | 6/2007 | Banerjea et al. | 455/556.1 |
| 2007/0223365 A1* | 9/2007 | Tsfaty et al. | 370/208 |
| 2008/0013567 A1* | 1/2008 | Benveniste | 370/447 |
| 2008/0232339 A1* | 9/2008 | Yang et al. | 370/342 |

\* cited by examiner

*Primary Examiner*—Andrew Lee
(74) *Attorney, Agent, or Firm*—Grossman, Tucker, Perreault & Pfleger, PLLC (57) ABSTRACT

Disclosed are a method and a computer program product for achieving fairness in utilization of a channel in a network. The network includes plurality of stations such that at least one station of the plurality of stations includes at least one radio. The at least one radio may fail to access the channel even when the channel is available for performing transmission. The method includes determining a number of idle slots occurred at the channel during a disruption period when the at least one radio is unavailable for transmission. The number of idle slots occurred during the disruption period may be accumulated as a credit. Based on the accumulated credit, an initial value of a backoff counter of the at least one station may be reset. The reset initial value of the backoff counter enables the at least one radio to utilize the accumulated idle slots for next transmission.

20 Claims, 5 Drawing Sheets

METHOD FOR ACHIEVING FAIRNESS IN A NETWORK

FIELD OF THE DISCLOSURE

The present disclosure generally relates to a method for achieving fairness in a network, and, more particularly, to achieving fairness in utilization of a channel by a multi radio platform (MRP) radio in the network.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The present disclosure provides a method for achieving fairness in accessing a network. The network includes a plurality of stations. Examples of the plurality of stations include a laptop, a mobile phone, a personal computer (PC), a personal digital assistant (PDA), and the like. At least one station of the plurality of stations may utilize multi-radio platform (MRP) and may be equipped with plurality of radios, for example, a WiFi radio, and a WiMAX radio.

The MRP enables plurality of radios at a station to access the network. Typically, each radio of the multiple radios may be assigned a separate bandwidth of a frequency spectrum. Although each radio, for example, the WiFi radio and the WiMAX radio, may be allocated a separate frequency bandwidth, cross-band radio frequency (RF) leaking may occur on the MRP platform, thereby causing a destructive interference among the plurality of radios. Generally, interference may be reduced by time division multiplexing (TDM) scheduling of plurality of radios. In TDM scheduling, only one radio operates at a time, thereby resulting in perfect isolation between the plurality of radios.

Figure 1:
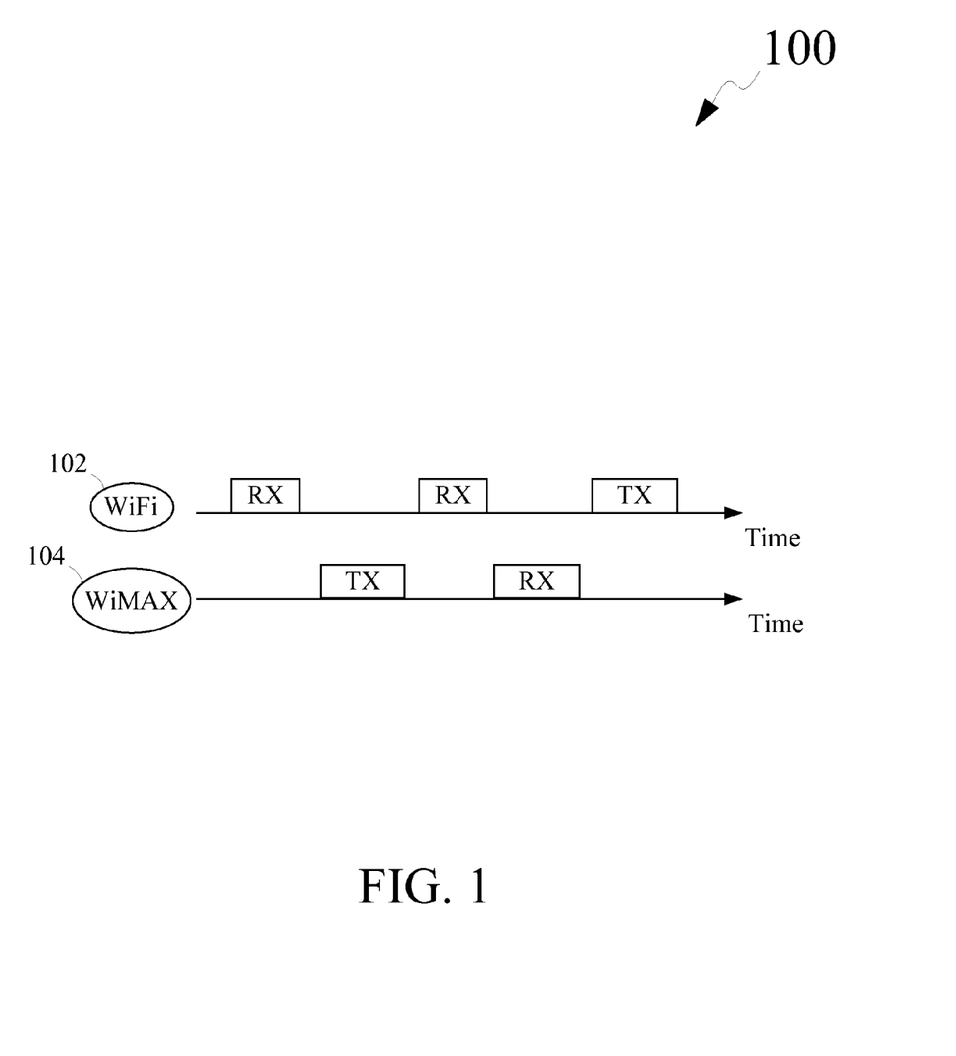
FIG. 1 illustrates a typical time division multiplexing (TDM) scheduling of a plurality of radios at a station.

FIG. 1 illustrates a typical TDM scheduling of plurality of radios, for example, a WiFi radio 102 and a WiMAX radio 104, at a station (not shown) so that overlapping of frequency bands may not occur in a time domain. In TDM scheduling, a radio may either avoid receiving or transmitting a data on a channel when the other radio is transmitting or receiving the data on the channel. For example, when the WiMAX radio 104 is receiving the data, the WiFi radio 102 may neither receive the data nor send the data. Similarly, when the WiFi radio 102 is transmitting the data, the WiMAX radio 104 may neither receive the data nor send the data. Accordingly, a scheduling is achieved because the data flow is controlled to allow for the timing division.

Figure 2:
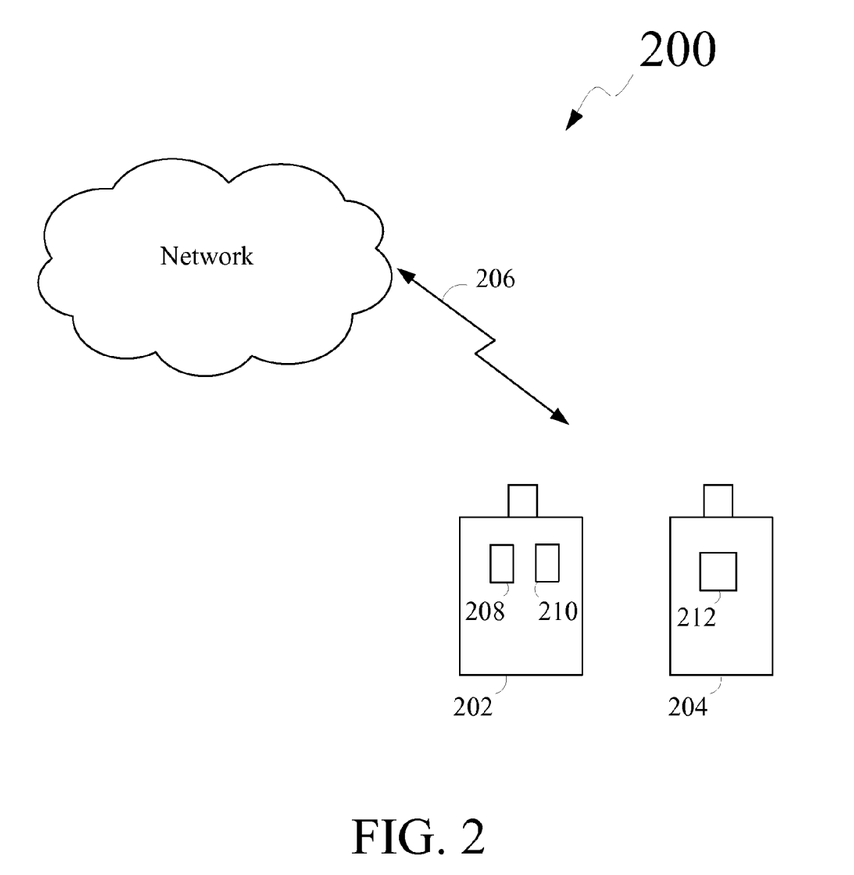
FIG. 2 illustrates an exemplary network, in accordance with an embodiment of the present disclosure.

FIG. 2 illustrates an exemplary network 200 in accordance with an embodiment of the present disclosure. The network 200 includes a plurality of stations, for example, a station 202 and a station 204. The plurality of stations is capable of communicating in the network 200 via a channel 206. At least one station of the plurality of stations, for example, the station 202, may be equipped with MRP. Accordingly, the station 202 may perform transmission using at least one of a WiFi radio 208 (hereinafter referred to as MRP WiFi radio 208) and a WiMAX radio 210. The station 204 may perform transmission through a standalone WiFi radio 212.

However, the frequency bandwidth utilized by the MRP WiFi radio 208 and the standalone WiFi radio 212 may overlap while performing transmission via the channel 206, thereby resulting in a collision between the data transmission by the MRP WiFi radio 208 and the standalone WiFi radio 212.

Typically, a WiMAX radio provides a subscription-based service. Moreover, the WiMAX radio may carry Quality of Service (QoS) sensitive data, such as voice communications. Accordingly, a WiMAX radio may allow operations of a collocated MRP WiFi radio, for example, the MRP WiFi radio 208 only when the MRP WiFi radio does not conflict with operations of the WiMAX radio, for example, the WiMAX radio 210. Consequently, there may be a temporary period during which the MRP WiFi radio 208 may not be able to access the channel 206 and perform transmission. This period may be termed as a disruption period for the station 202.

In summary, when the MRP WiFi radio 208 and the standalone WiFi radio 212 simultaneously attempt to perform transmission via the channel 206, there may be a possibility of occurrence of collision between the data transmitted by the MRP WiFi radio 208 and the standalone WiFi radio 212. Even if the MRP WiFi radio 208 secures a chance to access the channel 206, it may have to compete with the WiMAX radio 210 to access the channel 206. The MRP WiFi radio 208 may not be able to perform the transmission via the channel 206 as the WiMAX radio 210 may get preference to access the channel 206, which preference thereby results in a disruption of the MRP WiFi radio 208. A time period during which the MRP WiFi radio 208 experiences the disruption may be termed a disruption period. The disruption period may add a waiting time for the MRP WiFi radio 208 of the station 202 before each transmission attempt. Accordingly, a station with disruption, for example, the station 202 may be at a disadvantage in comparison to a station without disruption, for example, the station 204. Accordingly, the MRP WiFi radio 208 may be compensated for lost channel access opportunities due to disruptions, so that a long-term fairness among WiFi radios of the plurality of stations may be regained.

The long-term fairness in a network may be achieved by reducing a probability of repeated collisions at the two stations experiencing data collisions. In a typically known method, the stations experiencing data collisions are made to wait a random period of time before retransmitting the data. The random period may be determined based on a backoff algorithm and may be termed as a backoff time. The backoff time for each station may be calculated based on a random number. For each station, the backoff time may be recalculated after each transmission attempt. When repeated collisions occur, the transmission is repeated. However, the backoff time is increased with each attempt, thereby reducing the probability of another collision.

For example, following a collision, each station, i.e. the station 202 and the station 204, may generate a distinct random number selected from a range of values. Thereafter, the stations may wait that number of slot times before attempting retransmission. The range of values increases exponentially after each failed retransmission. For example, for a first transmission attempt the range may be 0 to 1; for a second transmission attempt, the range may be 0 to 3; for a third transmission attempt, the range may be 0 to 7 and so on. Moreover, a backoff counter may be decreased by 1 for every slot, as long as the channel 206 is sensed as idle during that slot time. Transmission may commence only when the backoff counter reaches zero. Thereafter, an initial value of the backoff counter may be reset for a next transmission.

Accordingly, the standalone WiFi radio 212 of the station 204 may transmit when the channel 206 is available and the backoff counter of the station 204 reaches zero. However, transmission by the MRP WiFi radio 208 is subjected to an additional constraint, i.e. availability of the MRP WiFi radio 208. More specifically, the MRP WiFi radio 208 may transmit when three conditions are satisfied i.e. the channel 206 is available, a backoff counter of the station 202 reaches zero, and the MRP WiFi radio 208 is available for transmission.

As used herein, for compensating the loss of channel access opportunities and for providing fairness to the MRP WiFi radio 208 in the network 200, the present disclosure provides a method, whereby a smaller backoff counter for the disrupted MRP WiFi radio 208 may be utilized.

The method includes reducing an initial value of the backoff counter so that the reduced value of the backoff counter may be used while performing a subsequent transmission. Since the initial value of the backoff counter is reduced, the value of backoff counter may more often become zero during the disruption period.

Accordingly, if b represents an initial value of the backoff counter of the station 202, x represents a random integer uniformly distributed between 0 and a contention window (CW), and σ represents a number of slots used to reduce the initial value of the backoff counter, then the value of backoff counter for each transmission attempt of the station 202 may be reduced as per the following equation:

$$b = x - \sigma \quad (1)$$

The number of slots σ may be accumulated as credit slots for each transmission attempt of the station 202 and may be utilized for reducing the value of backoff counter of the station 202. Moreover, for the standalone WiFi radio 212, b=x.

For achieving fairness in the network 200, the stations, for example, the station 202 and the station 204, may obtain a same number of transmission opportunities, if the stations 202 and 204 share a same channel status. More specifically, if a disruptive MRP WiFi radio 208 and a non-disruptive standalone WiFi radio 212 are located at same position, they may obtain the same number of transmission opportunities.

After a collision occurs in the network 200, each station may wait for a backoff time before performing a retransmission of data. Accordingly, a total elapsed time observed by each station, for example, the station 202 and the station 204 may be given by:

$$t^{(u)} = \sum_{i=1}^{n^{(u)}} (s_i^{(u)} + d_i^{(u)} + b_i^{(u)}) \text{ and} \quad (2)$$

$$t^{(v)} = \sum_{i=1}^{n^{(v)}} (s_i^{(v)} + d_i^{(v)} + b_i^{(v)}) \quad (3)$$

where $t^{(u)}, t^{(v)}$: total elapsed time observed by a station u and a station v, respectively, $n^{(u)}, n^{(v)}$: total number of transmission attempts by the station u and the station v during $t^{(u)}$, and $t^{(v)}$, respectively, $d_i^{(u)}, d_i^{(v)}$: number of busy slots between the (i−1)th and ith transmission attempt of the station u and the station v, respectively (including the (i−1)th transmission attempt of the station u and the station v, respectively, and the busy slots during disruption periods), $s_i^{(u)}, s_i^{(v)}$: number of idle slots occurred during disruption periods between the (i−1)th and the ith transmission attempt of the station u and the station v, respectively, and $b_i^{(u)}, b_i^{(v)}$: number of backoff slots between the (i−1)th and the ith transmission attempt of the station u and the station v, respectively, given by $x_i^{(u)} - \sigma_i^{(u)}$ and $x_i^{(v)} - \sigma_i^{(v)}$, respectively.

Here superscript u refers to the station 202 and superscript v refers to the station 204.

Moreover, when the station 202 and the station 204 observe the channel 206 for the same (sufficiently long) period of time, then $t^{(u)} = t^{(v)}$.

Also, since the station 202 and the station 204 share a common channel status, they observe a same amount of channel busy time. In other words, the stations may observe same number of busy slots.

$$\text{i.e. } \sum_{i=1}^{n^{(u)}} d_i^{(u)} = \sum_{i=1}^{n^{(v)}} d_i^{(v)} \quad (4)$$

Additionally, for a sufficiently long time period, the backoff slots for each station may be based on an average CW, i.e.

$$\sum_{i=1}^{n^{(u)}} b_i^{(u)} = n^{(u)} \frac{\overline{W}}{2} - \sum_{i=1}^{n^{(u)}} \sigma_i^{(u)} \text{ and} \quad (5)$$

$$\sum_{i=1}^{n^{(v)}} b_i^{(v)} = n^{(v)} \frac{\overline{W}}{2} - \sum_{i=1}^{n^{(v)}} \sigma_i^{(v)}$$

where $\overline{W}$ is an average CW size.

By combining Equations. (1) to (5), $$n^{(u)} - n^{(v)} = \frac{\sum_{i=1}^{n^{(v)}} (s_i^{(v)} - \sigma_i^{(v)}) - \sum_{i=1}^{n^{(u)}} (s_i^{(u)} - \sigma_i^{(u)})}{W} \quad (6)$$

By the definition of fair network $n^{(v)} = n^{(u)}$. This implies that $$\sum_{i=1}^{n^{(v)}} (s_i^{(v)}) = \sum_{i=1}^{n^{(v)}} (\sigma_i^{(v)}) \text{ and } \sum_{i=1}^{n^{(u)}} (s_i^{(u)}) = \sum_{i=1}^{n^{(u)}} (\sigma_i^{(u)}) \quad (7)$$

The conditions in equation (7) imply that if an exact amount of accumulated credits are paid back to a disrupted station, the long-term network fairness may be achieved. Further, it should be understood to a person skilled in the art that for a non-disrupted radio j, $s_i^{(j)}$ and $\sigma_i^{(j)}$ are both zero.

The method for achieving fairness described in the present disclosure includes determining a number of idle slots occurred at the channel 206 during the disruption period when the radio is unavailable for transmission. The number of idle slots during the disruption period may be accumulated as a credit. The credit may be paid back to the disrupted radio during a next transmission attempt. The disrupted radio may utilize the credit for resetting the initial value of the backoff counter. The reset initial value of the backoff counter may be lesser than the initial value of the back off counter used for a previous transmission attempt. Accordingly, a lower initial value of the backoff counter may reduce a waiting time for the MRP WiFi radio, for example, the MRP WiFi radio 208.

Figure 3:
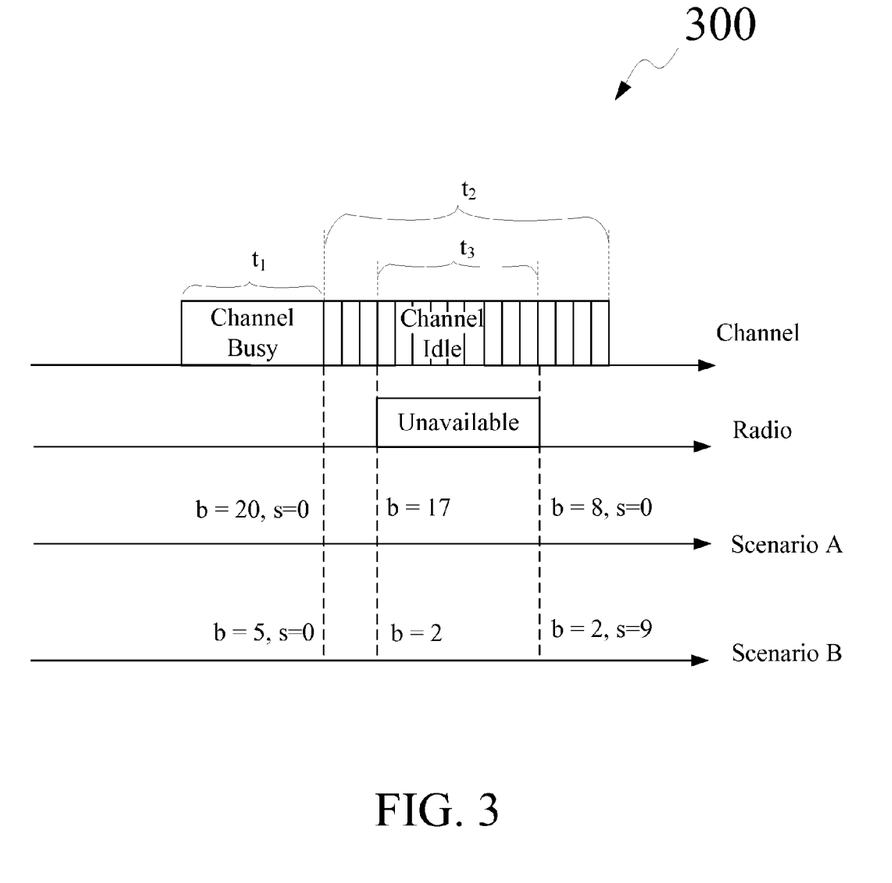
FIG. 3 illustrates a credit accumulation scheme for a multi-radio platform (MRP) WiFi radio, in accordance with an embodiment of the present disclosure.

FIG. 3 illustrates a credit accumulation scheme for a MRP WiFi radio, for example, the MRP WiFi radio 208, in accordance with an embodiment of the present disclosure. The credit accumulation scheme may include sensing the channel 206. 'Sensing the channel' hereinafter refers to determining the channel as being idle or busy. The MRP WiFi radio 208 may sense the channel 206 during the disruption periods. Accordingly, the MRP WiFi radio 208 may continue to reduce the backoff counter upon idle slots even during the disruption period. As illustrated in FIG. 3, the channel 206 is sensed to be busy for a time period $t_1$ and idle for the time period $t_2$. Moreover, during the time period $t_2$, the MRP WiFi radio 208 is unavailable for the disruption period $t_3$. The slots occurred during the time period $t_2$ may be referred to as idle slots. Moreover, the idle slots during the disruption period $t_3$ may be accumulated as credits.

The credits may accumulate only when the backoff counter reaches zero within the disruption period $t_3$. As illustrated for scenario A, the initial value of the backoff counter for the station 202 is 20, which is large enough at the beginning of disruption period $t_3$. Accordingly, the backoff counter may not become zero within the disruption period $t_3$. For example, even after the disruption period $t_3$ is over, the value of backoff counter is reduced to 8. Accordingly, in scenario A, the MRP WiFi radio 208 may continue to reduce the backoff counter upon idle slots, however may not accumulate any credit.

In scenario B, the initial value of backoff counter is much lower (being 5) and may become zero within the disruption period $t_3$. However, the MRP WiFi radio 208 may not be able to perform transmission due to the disruption period $t_3$. Accordingly, the value of backoff counter at the beginning of disruption period $t_3$ may be recorded and subsequently restored at the end of the disruption period $t_3$. For example, as illustrated for the scenario B, the value of the backoff counter at the start of the disruption period $t_3$ is 2. This value of the backoff counter may be recorded. Thereafter, the same value of the backoff counter may be restored at the end of disruption period $t_3$. This may be done to prevent immediate transmission of data after the end of the disruption period $t_3$, which may lead to high collision probability.

Furthermore, the idle slots occurring within the disruption period may be accumulated as credits. For example, as illustrated for scenario B, the idle slots at the beginning of the disruption period $t_3$ are zero. During the disruption period nine idle slots have occurred. These nine idle slots are accumulated as credit and may be used to reduce the number of backoff slots for next transmission attempts of the station 202.

In one embodiment, the initial value of the backoff counter may be reset for each transmission attempt based on the accumulated number of idle slots, according to the following relation:

$$b = [x - \min(r_{max}x, s)] \quad (8)$$

such that $[x - \min(r_{max}x, s)]$ gives the closest integer.

where,
 b is the initial value of backoff counter,
 s the accumulated number of idle slots or credits, and
 $r_{max}$ is the threshold credit payback ratio.

The value of $r_{max}$ may be used to determine the number of idle slots to be used as credit for each transmission attempt. If too many credits are paid back at one time, the probability of collision in the network may increase significantly. For one embodiment, the value of $r_{max}$ may be 0.5.

Moreover, the credits may be deducted from the accumulated number of idle slots when the credits are utilized. That is, $$s = s - (x - b) \quad (9)$$

In one embodiment, each accumulated slot may include a timestamp. The timestamp may be utilized for preventing backlog of the accumulated slots. Moreover, each accumulated slot may be associated with a predetermined time, during which the credit may be utilized by the MRP WiFi radio 208. If the accumulated slot is not used within the predetermined time, it may be removed. For example, the accumulated slot may wait for a predetermined time, say 10 seconds, to be utilized as a credit, after which it may be removed. More specifically, a credit queue having the accumulated slots may be First-in-First-out (FIFO). In one embodiment, the predetermined time may be re-configured.

Figure 4:
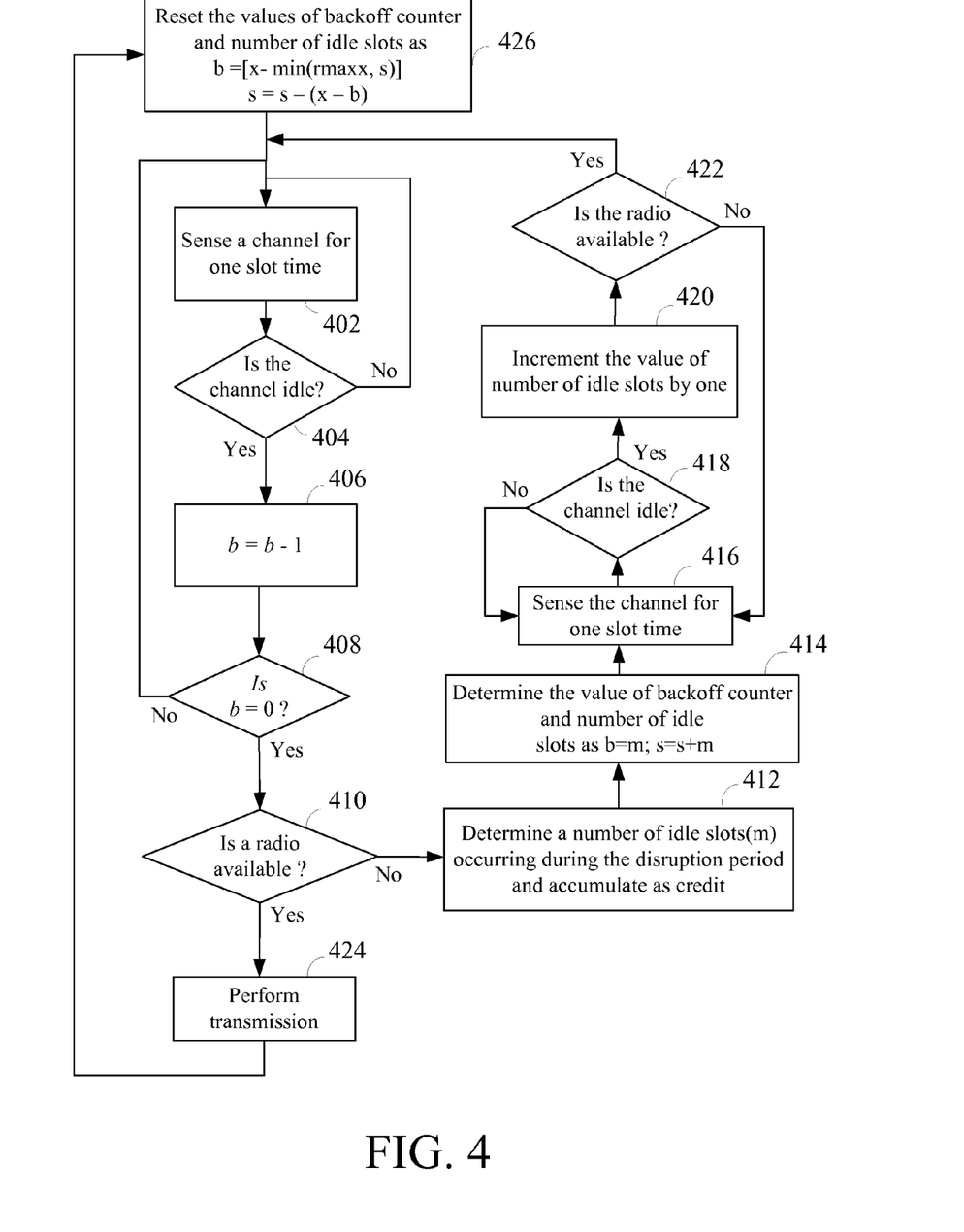
FIG. 4 is a flow chart illustrating a method for achieving fairness in utilization of a channel in a network, in accordance with an embodiment of the present disclosure.

FIG. 4 is a flow chart illustrating a method for achieving fairness in utilization of the channel 206 in the network 200, in accordance with an embodiment of the present disclosure. In the network 200, the MRP WiFi radio 208 may sense the channel 206 for one slot time during the disruption period, at 402. This may be termed as non-disruptive sensing, since even during the disruption period, the MRP WiFi radio 208 is capable of sensing the channel 206. As already mentioned, the disruption period may be the time period during which the MRP WiFi radio 208 is unavailable for performing transmission of data.

Based on the channel sensing, the MRP WiFi radio 208 may determine whether the channel 206 is idle or busy, at 404. The sensing repeats till it is determined that the channel 206 is idle. Thereafter, the MRP WiFi radio 208 may continue to reduce the backoff counter upon idle slots, at 406. Subsequently, at 408, it is determined whether or not the value of backoff counter for the MRP WiFi radio 208 is reduced to zero. This may be determined because the zero value of the backoff counter enables the MRP WiFi radio 208 of the station 202 to perform transmission when the MRP WiFi radio 208 is available. The above determination repeats till it is determined at 408 that the value of backoff counter is reduced to zero.

Thereafter, it is determined whether or not the MRP WiFi radio 208 is available, at 410. If at 410, it is determined that the MRP WiFi radio 208 is not available, the number of idle slots (m) during the disruption period may be determined and the credit is accumulated at 412. The disruption period may start from the instant at which it is determined that the MRP WiFi radio 208 is unavailable. More specifically, the time duration during which the MRP WiFi radio 208 is not available even though the channel 206 is available for transmission is termed as the disruption period.

Thereafter, the values of backoff counter for the MRP WiFi radio 208 and the number of idle slots during the disruption period may be calculated, at 414. In one embodiment, the backoff counter may be assigned a value of the number of idle slots during the disruption period i.e. b=m. In another embodiment, the value of backoff counter at the beginning of the disruption period may be recorded and subsequently restored at the end of the disruption period. Moreover, the value of idle slots may be calculated by incrementing the number of idle slots by the number of idle slots occurred during the disruption period, i.e. s=s+m. More specifically, the value of idle slots may be incremented each time an idle slot is occurred during the disruption period.

Subsequently, the channel 206 may be sensed for one slot time, at 416. Based on the channel sensing it may be determined whether the channel 206 is idle or busy, at 418. The radio may continue to sense the channel for one slot duration till it is determined that the channel is idle. When it is determined that the channel is idle, the number of idle slots may be incremented by one, at 420. Thereafter, it may be determined whether the MRP WiFi radio 208 is available, at 422. If it is determined that the MRP WiFi radio 208 is available, then 402 through 410 may be repeated. In other words, it is determined whether or not the channel 206 is idle, at 404; and whether or not the value of backoff counter is zero, at 408. When it is determined that the channel 206 is idle (at 404) and the value of backoff counter is zero (at 408) and the MRP WiFi radio 208 is available, then the MRP WiFi radio 208 may perform a transmission at 424. Subsequently, the values of backoff counter and the values of available number of slots may be reset based on the accumulated number of idle slots or credits, at 426. As already mentioned, the values of backoff counter and the values of available number of slots may be reset according to the equations (8) and (9).

Figure 5:
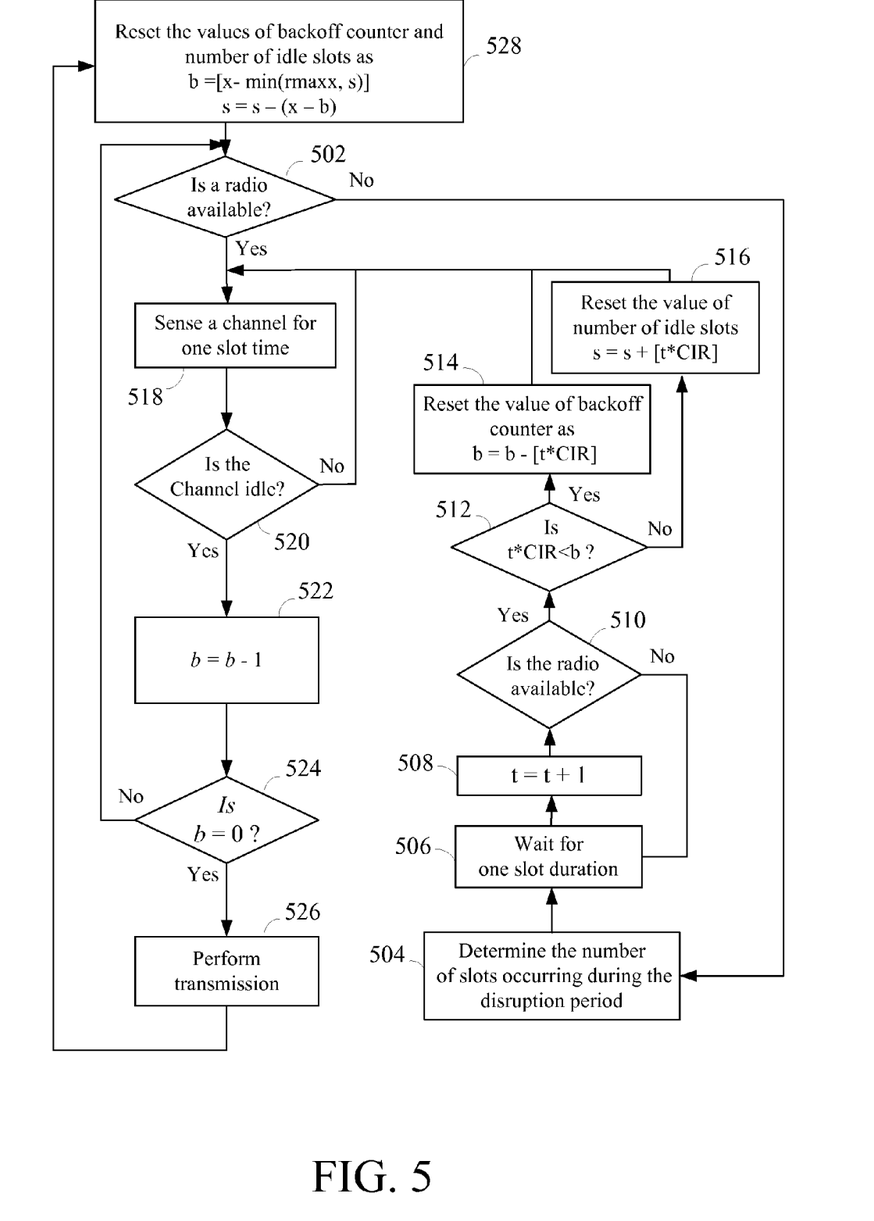
FIG. 5 is a flow chart illustrating a method for achieving fairness in utilization of a channel in a network, in accordance with another embodiment of the present disclosure.

FIG. 5 is a flow chart illustrating a method for achieving fairness in utilization of the channel 206 in the network 200, in accordance with another embodiment of the present invention. In the network 200, it is determined whether the MRP WiFi radio 208 is available for transmission or not, at 502. If it is determined that the MRP WiFi radio 208 is not available, then, at 504, a number of slots occurring during the disruption period may be determined. As already mentioned, the disruption period may refer to the time period when the MRP WiFi radio 208 is unavailable. Thereafter, the MRP WiFi radio 208 may wait for one slot time, at 506. Accordingly, the disruption period may be incremented by one slot time at 508. Thereafter, it is determined whether the MRP WiFi radio 208 is available or not, at 510. If it is determined at 510 that the MRP WiFi radio 208 is available, a Channel Idle Ratio (CIR) may be measured to estimate the number of idle slots occurred during the disruption period. The CIR may be measured when the MRP WiFi radio 208 is not able to obtain status of the channel 206 during the disruption period.

In an embodiment, the CIR may be calculated as a ratio of a total idle time occurred at the channel 206 during the disruption period and a total undisrupted duration of the MRP WiFi radio 208:

$$\text{i.e. } CIR = \frac{\sum_{i=1}^{M} X_i}{\sum_{i=1}^{M} T_i} \tag{10}$$

where, $T_i$ is the undisrupted duration of the MRP WiFi radio 208 between its (i−1)th and ith transmission attempt, $X_i$ is the idle time of the channel 206 during $T_i$, and M is the number of transmission attempts for each CIR measurement.

The number of idle slots occurred within the disruption period may be estimated as a product of the disruption period for the radio MRP WiFi radio 208 and the CIR. Moreover, it is determined whether the number of idle slots calculated from equation (10) is less than the backoff counter of the MRP WiFi radio 208 or not, at 512. If it is determined that the number of idle slots calculated from equation (10) is less than the backoff counter of the MRP WiFi radio 208, the value of the backoff counter may be reset to {b−[t*CIR]}, at 514. However, if it determined that the value of idle slots calculated from equation (10) is not less than the backoff counter of the MRP WiFi radio 208, the number of idle slots may be calculated as {s+[t*CIR]}, at 516.

Thereafter, it is determined whether the channel 206 is idle or not, and whether the value of backoff counter is reduced to zero or not. This may be determined by performing 518 through 524. As shown in FIG. 5, the sensing of the channel 206 for one slot duration, at 518; determining whether the channel 206 is idle, at 520; reducing the value of backoff counter till it reaches zero, at 522 and 524; and resetting the value of the number of idle slots and the backoff counter, at 528; are same as in the embodiment described with respect to FIG. 4 of the present disclosure. The method illustrated in FIG. 5 is different from FIG. 4 because the method may be used during disruptive sensing, i.e. when the MRP WiFi radio 208 is not able to determine the number of idle slots during the disruption period. Accordingly, the method illustrated in FIG. 5 utilizes CIR for calculating the number of idle slots during the disruption period.

The present disclosure provides a method for achieving fairness in utilization of a channel in a network. The method enables a MRP device to regain the fair share of frequency bandwidth in the network. The method facilitates determining a number of idle slots occurring at a channel during the period when a MRP radio corresponding to a MRP device is not available for performing transmission. These idle slots are accumulated as credits, and subsequently used to reduce the backoff duration of the MRP radio for a future transmission. Accordingly, the MRP radio is compensated for lost channel access opportunities due to disruption and long-term fairness among WiFi radios may be regained.

As described above, the embodiments of the present disclosure may be in the form of computer-implemented processes and apparatuses for practicing those processes. Embodiments of the present disclosure may also be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the present disclosure. The present disclosure can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method for achieving fairness in utilization of a channel in a network, the network comprising a plurality of stations such that at least one station of the plurality of stations comprise at least one radio, the at least one radio failing to access the channel, the method comprising:
   determining a number of idle slots occurred at the channel during a disruption period, the disruption period being a time period when the at least one radio is unavailable for performing transmission;
   accumulating the number of idle slots during the disruption period as a credit; and
   resetting an initial value of a backoff counter of the at least one radio based on the accumulated credit, wherein the reset initial value of the backoff counter enabling the at least one radio to utilize the accumulated idle slots for a next transmission.

2. The method of claim 1, wherein determining the number of idle slots occurred during the disruption period further comprises calculating a Channel Idle Ratio (CIR) during the disruption period.

3. The method of claim 2 further comprising estimating the number of idle slots within the disruption period as a product of the disruption period and the CIR.

4. The method of claim 1 further comprising:
   recording the initial value of the backoff counter before a start of disruption period; and
   restoring the initial value of the backoff counter at the end of the disruption period.

5. The method of claim 1 further comprising determining a threshold value of a credit payback ratio, wherein the credit payback ratio determines the number of idle slots to be utilized as the credit.

6. The method of claim 5, wherein a value of credit payback ratio is 0.5.

7. The method of claim 5, wherein the initial value of the backoff counter for the transmission is based on the credit payback ratio.

8. The method of claim 5 further comprising deducting the credit from the accumulated idle slots when the credit is utilized for the next transmission.

9. The method of claim 1, wherein each credit of the accumulated credit comprises a timestamp.

10. The method of claim 1 further comprising removing the credit from the accumulated number of idle slots after a predetermined time.

11. The method of claim 1, wherein resetting the initial value of the backoff counter comprises reducing a number of backoff counter of the at least one radio, further wherein a zero value of the backoff counter enables the at least one radio to perform transmission.

12. A computer program product embodied on a computer readable medium for achieving fairness in utilization of a channel in a network, the network comprising a plurality of stations such that at least one station of the plurality of stations comprise at least one radio, the at least one radio failing to access the channel, the computer program product comprising a program module having instructions for:
   determining a number of idle slots occurred at the channel during a disruption period, wherein the disruption period is a time period when the at least one radio is unavailable for performing transmission;
   accumulating the number of idle slots during the disruption period as a credit; and
   resetting an initial value of a backoff counter of the at least one radio based on the accumulated credit, wherein the reset initial value of the backoff counter enabling the at least one radio to utilize the accumulated idle slots for a next transmission.

13. The computer program product of claim 12, wherein determining the number of idle slots occurred during the disruption period further comprises calculating a Channel Idle Ratio (CIR) during the disruption period.

14. The computer program product of claim 13 further comprising the program module having instructions for estimating the number of idle slots within the disruption period as a product of the disruption period and the CIR.

15. The computer program product of claim 13 further comprising the program module having instructions for determining a threshold value of a credit payback ratio, wherein the credit payback ratio determines the number of idle slots to be utilized as the credit.

16. The computer program product of claim 13, wherein a value of credit payback ratio is 0.5.

17. The computer program product of claim 12 further comprising the program module having instructions for:
   recording the initial value of the backoff counter before a start of disruption period; and
   restoring the initial value of the backoff counter at the end of the disruption period.

18. The computer program product of claim 12 further comprising the program module having instructions for deducting the credit from the accumulated idle slots when the credit is utilized for the next transmission.

19. The method of claim 12, wherein each credit of the accumulated credit comprises a timestamp.

20. The computer program product of claim 12 further comprising the program module having instructions for removing the credit from the accumulated number of idle slots after a predetermined time.

* * * * *